(12) United States Patent
Tomita

(10) Patent No.: US 11,697,305 B2
(45) Date of Patent: Jul. 11, 2023

(54) TIRE FOR A MOTORCYCLE

(71) Applicant: Sumitomo Rubber Industries, Ltd., Hyogo (JP)

(72) Inventor: Kota Tomita, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 260 days.

(21) Appl. No.: 17/083,095

(22) Filed: Oct. 28, 2020

(65) Prior Publication Data

US 2021/0155040 A1    May 27, 2021

(30) Foreign Application Priority Data

Nov. 25, 2019    (JP) .................................. 2019-212483

(51) Int. Cl.
| | |
|---|---|
| *B60C 1/00* | (2006.01) |
| *B60C 11/00* | (2006.01) |
| *C08F 236/10* | (2006.01) |
| *C08L 9/06* | (2006.01) |
| *C08K 3/04* | (2006.01) |
| *C08K 3/36* | (2006.01) |

(52) U.S. Cl.
CPC ........ *B60C 1/0016* (2013.01); *B60C 11/0008* (2013.01); *C08F 236/10* (2013.01); *C08K 3/04* (2013.01); *C08K 3/36* (2013.01); *C08L 9/06* (2013.01); *B60C 2011/0025* (2013.01); *B60C 2200/10* (2013.01); *C08L 2205/025* (2013.01); *C08L 2205/03* (2013.01)

(58) Field of Classification Search
CPC .... C08K 3/04; C08K 3/36; C08L 9/06; B60C 11/00; B60C 1/00; C08F 236/10
USPC .......................................................... 524/526
See application file for complete search history.

(56) References Cited

U.S. PATENT DOCUMENTS

2014/0228495 A1*    8/2014 Miyazaki ............... C08G 12/32
                                                                  524/398

FOREIGN PATENT DOCUMENTS

| EP | 3450475 A1 * | 3/2019 | .............. B60C 1/00 |
| JP | 2008-307933 A | 12/2008 | |
| WO | WO-2011158509 A1 * | 12/2011 | .......... B60C 1/0016 |
| WO | WO-2017187907 A1 * | 11/2017 | .............. B60C 1/00 |
| WO | WO-2018128141 A1 * | 7/2018 | .............. B60C 1/00 |

* cited by examiner

*Primary Examiner* — Deve V Hall
(74) *Attorney, Agent, or Firm* — Studebaker & Brackett PC

(57) ABSTRACT

Provided is a tire for a motorcycle having an improved turning stability on wet road surface, the tire comprises a tread composed of a rubber composition, which comes into contact with a road surface, wherein Hs being a rubber hardness and M300 being a tensile stress (MPa) at 300% elongation of the rubber composition of the tread satisfy Equations 1, 2, and 3:

$60 \leq Hs \leq 80$,                                                Equation 1:

$2 \leq M300 \leq 12$, and                                    Equation 2:

$(M300-2)/(Hs-60) \leq 0.75$.                     Equation 3:

8 Claims, No Drawings

TIRE FOR A MOTORCYCLE

TECHNICAL FIELD

The present invention relates to a tire for a motorcycle.

BACKGROUND ART

A body of a motorcycle is greatly tilted during turning. Therefore, not only a straight running stability but also a turning stability is required for a tire for a motorcycle (JP 2008-307933 A).

SUMMARY OF THE INVENTION

Problem to be Solved by the Invention

A motorcycle, unlike a four-wheeled vehicle, cannot be completely steered if it loses grip performance of tire. During straight running, grip performance feeling of tire becomes an important factor for a sensory evaluation on a vehicle stability of an actual vehicle. This grip performance feeling during straight running improves when the tire has rigidity. That is, the straight running stability improves.

On the other hand, a motorcycle cannot make a turn by just steering the vehicle but makes a turn with the vehicle inclined. During turning, a ground contact feeling of tire becomes an important factor for a sensory evaluation on a vehicle stability of an actual vehicle. This ground contact feeling during turning improves when the tire has softness in a high strain condition (a road surface follow-up property). That is, the turning stability improves. In particular, since a friction coefficient ($\mu$) of a road surface lowers on a wet road surface, the road surface follow-up property has a large influence on turning stability on wet road surface. However, if rigidity of a tire is improved, road surface follow-up property tends to deteriorate.

It is an object of the present invention to provide a tire for a motorcycle with improved turning stability on wet road surface.

As a result of intensive studies, the present inventor has found that, for a tread rubber of a tire, an excellent turning stability on wet road surface can be obtained by using a Hs as a rigidity index and a M300 as a road surface follow-up property index, setting both of the Hs and M300 within a predetermined range, and further suppressing an extent of increase in M300 relative to increase in Hs within a predetermined range, and conducted further studies to complete the present invention.

That is, the present invention relates to,

[1] A tire for a motorcycle comprising:

a tread composed of a rubber composition, which comes into contact with a road surface, wherein Hs being a rubber hardness and M300 being a tensile stress (MPa) at 300% elongation of the rubber composition of the tread satisfy Equations 1, 2, and 3:

Equation 1: $60 \leq Hs \leq 80$, preferably $62 \leq Hs \leq 80$, more preferably $64 \leq Hs \leq 79$, and further preferably $66 \leq Hs \leq 78$;

Equation 2: $2 \leq M300 \leq 12$, preferably $2 \leq M300 \leq 11$, more preferably $2 \leq M300 \leq 10$, further preferably $3 \leq M300 \leq 9$, and even further preferably $3 \leq M300 \leq 8$; and Equation 3: $(M300-2)/(Hs-60) \leq 0.75$,

[2] The tire for a motorcycle of [1], wherein Equation 3 is:

$$(M300-2)/(Hs-60) \leq 0.69,$$

[3] The tire for a motorcycle of [1], wherein Equation 3 is:

$$(M300-2)/(Hs-60) \leq 0.53,$$

[4] The tire for a motorcycle of any of [1] to [3], wherein Equation 1 is:

$$68 \leq Hs \leq 78,$$

[5] The tire for a motorcycle of any of [1] to [4], wherein Equation 2 is:

$4 \leq M300 \leq 11$, preferably $4 \leq M300 \leq 10$, more preferably $4 \leq M300 \leq 9$, and further preferably $4 \leq M300 \leq 8$,

[6] The tire for a motorcycle of any of [1] to [5], wherein the rubber composition comprises a rubber component comprising a styrene-butadiene rubber,

[7] The tire for a motorcycle of [6], wherein the rubber composition further comprises carbon black,

[8] The tire for a motorcycle of [6] or [7], wherein the rubber composition further comprises silica and a silane coupling agent, and

[9] The tire for a motorcycle of any of [6] to [8], wherein the rubber composition further comprises resin.

According to the present invention, a tire for a motorcycle with improved turning stability on wet road surface can be provided.

DETAILED DESCRIPTION

The present disclosure relates to a tire for a motorcycle comprising a tread composed of a rubber composition, which comes into contact with a road surface, wherein Hs being a rubber hardness and M300 being a tensile stress (MPa) at 300% elongation of the rubber composition of the tread satisfy Equations 1, 2, and 3:

$$60 \leq Hs \leq 80; \qquad \text{Equation 1:}$$

$$2 \leq M300 \leq 12; \text{ and} \qquad \text{Equation 2:}$$

$$(M300-2)/(Hs-60) \leq 0.75. \qquad \text{Equation 3:}$$

Equation 3 is preferably $(M300-2)/(Hs-60) \leq 0.69$.
Equation 3 is preferably $(M300-2)/(Hs-60) \leq 0.53$.
Equation 1 is preferably $68 \leq Hs \leq 78$.
Equation 2 is preferably $4 \leq M300 \leq 11$.

It is preferable that the rubber composition comprises a rubber component comprising a styrene-butadiene rubber.

It is preferable that the rubber composition further comprises carbon black.

It is preferable that the rubber composition further comprises silica and a silane coupling agent.

It is preferable that the rubber composition further comprises resin.

Hereinafter, the present disclosure will be described in detail.

The above-described "rubber hardness (Hs)" is a hardness measured under an environment of 23° C. with a durometer type A according to JIS K 6253.

The above-described "tensile stress at 300% elongation (M300)" is a tensile stress (MPa) at 300% elongation measured using a Table-Top Type Precision Universal Tester (AGS-X) manufactured by Shimadzu Corporation, under an atmosphere of 23° C., for No. 3 dumbbell type specimens, according to JIS K 6251.

<Tread>

The tread of the present disclosure is composed of a rubber composition, which comes into contact with a road surface. The above-described Hs being a rubber hardness and the above-described M300 being a tensile stress (MPa) at 300% elongation of the tread satisfy Equations 1, 2, and 3:

$$60 \leq Hs \leq 80; \quad \text{Equation 1:}$$

$$2 \leq M300 \leq 12; \text{ and} \quad \text{Equation 2:}$$

$$(M300-2)/(Hs-60) \leq 0.75. \quad \text{Equation 3:}$$

The straight running stability of a motorcycle is influenced by a grip performance feeling of tire, and this grip performance feeling during straight running improves when the tire has a high rigidity. On the other hand, the turning stability of a motorcycle is influenced by a ground contact feeling of tire, and this ground contact feeling during turning improves when the tire has softness in a high strain condition (a road surface follow-up property). In particular, since a friction coefficient (p) of a road surface lowers on a wet road surface, the road surface follow-up property has a large influence on turning stability on wet road surface. However, in general, an effort for improvement in the rigidity deteriorates the road surface follow-up property, and conversely, an effort for improvement in the road surface follow-up property deteriorates the rigidity, and thus it has been difficult to obtain a tire with an excellent turning stability on wet road surface in addition to an excellent straight running stability.

The present disclosure realizes an excellent turning stability on wet road surface by using a predetermined Hs as a rigidity index and a predetermined M300 as a road surface follow-up property index, setting both of the Hs and M300 within a predetermined range, and further suppressing an extent of increase in M300 relative to increase in Hs within a predetermined range.

Equation 1 demands that Hs be within the range of 60 to 80. When Hs is less than 60, the straight running stability tends to become deteriorated. On the other hand, when Hs exceeds 80, it tends to become difficult in preventing deterioration of the turning stability on wet surface. Hs is preferably 62 or higher, more preferably 64 or higher, further preferably 66 or higher, and even further preferably 68 or higher. On the other hand, Hs is preferably 79 or lower, and more preferably 78 or lower. Hs can be adjusted by a conventional method. For example, Hs can be increased by reducing the oil content or increasing the carbon black content. On the other hand, Hs can be decreased by increasing the oil content or reducing the carbon black content.

Equation 2 demands that M300 be within the range of 2 to 12. When M300 is less than 2, it tends to become difficult in preventing deterioration of the straight running stability. On the other hand, M300 exceeds 12, the turning stability on wet road surface tends to become deteriorated. M300 is preferably 3 or higher, and more preferably 4 or higher. On the other hand, M300 is preferably 11 or lower, more preferably 10 or lower, further preferably 9 or lower, and even further preferably 8 or lower. M300 can be adjusted by a conventional method. For example, M300 can be increased by increasing the vulcanization accelerator content or increasing the sulfur content. On the other hand, M300 can be decreased by reducing the vulcanization accelerator content or reducing the sulfur content.

Equation 3 demands that M300 that has a tendency to increase along with increase in Hs be a predetermined value or lower in relation to Hs. Specifically, it demands that a value calculated by M300−2 be 0.75 times or less a value calculated by Hs−60. By suppressing increase in M300 along with increase in Hs, the turning stability on wet road surface can be improved while securing an excellent straight running stability in actual vehicle evaluation using the tire. When a value of (M300−2)/(Hs−60) exceeds 0.75, there is a tendency that sufficient turning stability on wet road surface cannot be secured. The value of (M300−2)/(Hs−60) is preferably 0.69 or below, and more preferably 0.53 or below.

<Rubber Composition>

The rubber composition of the present disclosure will be described as follows.

<<Rubber Component>>

As a rubber component, any of diene-based rubbers and non-diene-based rubbers commonly used in this field can be used, but at least diene-based rubber should be included. Diene-based rubbers preferably comprise a styrene-butadiene rubber (SBR) and more preferably consist of a SBR, or preferably comprise a SBR and a butadiene rubber (BR), and more preferably consist of a SBR and a BR.

(SBR)

The SBR is not particularly limited, and those which are common in the tire industry can be used such as, for example, an emulsion-polymerized SBR (E-SBR), a solution-polymerized SBR (S-SBR) and the like. The SBR may be used alone, or two or more thereof may be used in combination.

Furthermore, the SBR may be an unmodified SBR or a modified SBR, but a modified SBR is preferably used. As the modified SBR, those which are common in the tire industry can be used, including those in which a functional group interacting with a filler such as silica is introduced. Examples of such SBR include, for example, a terminal-modified SBR at least one terminal of which is modified with a compound (a modifying agent) having a functional group listed below, a main chain-modified SBR having a functional group listed below at the main chain, a main chain/terminal-modified SBR having a functional group listed below at the main chain and terminal (e.g., a main chain/terminal-modified SBR having a functional group listed below at the main chain and being modified with a compound (a modifying agent) having a functional group listed below at least one terminal thereof), a terminal-modified SBR being introduced a hydroxyl group or an epoxy group by modifying (coupling) with a multifunctional compound having two or more epoxy groups in a molecule, and the like.

Examples of the above-described functional group, for example, include an amino group (preferably, an amino group in which a hydrogen atom of the amino group is substituted with a C1-C6 alkyl group), an amide group, a silyl group, an alkoxysilyl group (preferably, a C1-C6 alkoxysilyl group), an isocyanate group, an imino group, an imidazole group, an urea group, an ether group, a carbonyl group, an oxycarbonyl group, a mercapto group, a sulfide group, a disulfide group, a sulfonyl group, a sulfinyl group, a thiocarbonyl group, an ammonium group, an imido group, a hydrazo group, an azo group, a diazo group, a carboxyl group, a nitrile group, a pyridyl group, an alkoxy group (preferably, a C1-C6 alkoxy group), a hydroxyl group, an oxy group, an epoxy group, and the like. In addition, these functional groups may have a substituent. Examples of the substituent can include, for example, those in which a functional group, such as an amino group, an amido group, an alkoxysilyl group, a carboxyl group, and a hydroxyl group, is introduced.

Moreover, examples of the modified SBR include those in which the above-described unmodified SBRs or modified SBRs are further hydrogenated, epoxidized, or tin-modified, and the like Among them, a modified SBR in which the above-described modified SBRs are further hydrogenated (a modified hydrogenated SBR) is preferable. The hydrogenated SBR is a hydrogenated SBR having improved molecular chain mobility with reduced double bond and increased single bond and has a tendency of improving the entanglement effect between polymers and enhancing the reinforcing property, and thus is preferably from the viewpoint of the effects of the present disclosure.

An oil-extended SBR or a non-oil-extended SBR can be used as a SBR. When the oil-extended SBR is used, the extending oil amount in SBR, i.e., the content of oil-extended oil contained in the SBR is preferably 10 to 50 parts by mass based on 100 parts by mass of the rubber solid content of SBR.

As a SBR, for example, SBRs manufactured and sold by Sumitomo Chemical Co., Ltd., JSR Corporation, Asahi Kasei Corporation, Zeon Corporation, etc. can be used.

The styrene content in the SBR is preferably 10% by mass or more, more preferably 15% by mass or more, and further preferably 20% by mass or more, from the reason that the effects of the present disclosure can be appropriately obtained. Furthermore, the styrene content is preferably 60% by mass or less, more preferably 50% by mass or less, and further preferably 40% by mass or less. In addition, in the present specification, the styrene content of SBR is calculated by $^1$H-NMR measurement.

The amount of bonded vinyl in the SBR is preferably 10% or more, more preferably 20% or more, further preferably 30% by mass or more, and even further preferably 35% by mass or more, from the reason that the effects of the present disclosure can be appropriately obtained. Furthermore, the amount of bonded vinyl is preferably 80% by mass or less, more preferably 70% by mass or less, and further preferably 65% by mass or less. In addition, in the present specification, the amount of bonded vinyl in the SBR (1,2-bond butadiene unit amount) is determined by infrared absorption spectrometry.

The glass transition temperature (Tg) of the SBR is preferably −90° C. or higher, more preferably −50° C. or higher, and further preferably −40° C. or higher, from the reason that the effects of the present disclosure can be appropriately obtained. Furthermore, the Tg is preferably 0° C. or lower, more preferably −10° C. or lower, and further preferably −15° C. or lower. In addition, in the present specification, the glass transition temperature is a value measured under a condition of a temperature rising rate of 10° C./m, using a differential scanning calorimeter (Q200) manufactured by TA Instruments Japan Inc., according to JIS K 7121.

The weight-average molecular weight (Mw) of SBR is preferably 200,000 or more, and more preferably 300,000 or more, from the reason that the effects of the present disclosure can be appropriately obtained. Furthermore, the Mw is preferably 2,000,000 or less, more preferably 1,500,000 or less, and further preferably, 1,000,000 or less. In addition, in the present specification, the weight-average molecular weight (Mw) can be calculated in terms of a standard polystyrene based on measurement values obtained by a gel permeation chromatography (GPC) (GPC-8000 Series manufactured by Tosoh Corporation, detector: differential refractometer, column: TSKGEL SUPERMULTIPORE HZ-M manufactured by Tosoh Corporation).

The content of SBR in 100% by mass of rubber component is preferably 60% by mass or more, and more preferably 80% by mass or more. Furthermore, the content of SBR may be 100% by mass. In the case of an oil-extended SBR, the content of SBR is a content of SBR itself excluding an oil-extended oil.

(BR)

The BR is not particularly limited, and those which are common in the tire industry can be used such as, for example, a BR having a content of cis-1,4 bond (cis content) of 90% or more (a high cis BR), a rare-earth-based butadiene rubber synthesized using a rare-earth element-based catalyst (a rare-earth-based BR), a BR containing a syndiotactic polybutadiene crystal (a SPB-containing BR), and a modified BR (a high cis modified BR, a low cis modified BR). Examples of the modified BR include BRs similarly modified as explained in the above-described SBR. The BR can be used alone, or two or more thereof can be used in combination.

Examples of the high cis BR include, for example, those manufactured by Zeon Corporation, Ube Industries, Ltd., JSR Corporation, and the like. The low-temperature property and abrasion resistance can be improved by containing the high cis BR. The cis content is preferably 95% or more, more preferably 96% or more, further preferably 97% or more, and even further preferably 98% or more. In the present specification, the cis content is a value calculated by infrared absorption spectrometry. As a rare-earth-based BR, those which are synthesized using a rare-earth element-based catalyst, have an amount of bonded vinyl (1,2-bond butadiene unit amount) of preferably 1.8% or less, more preferably 1.0% or less, and further preferably 0.8% or less, and have a cis content (cis-1,4 bond content) of preferably 95% or more, more preferably 96% or more, and further preferably 97% or more can be used. As a rare-earth-based BR, for example, those manufactured by LANXESS, etc. can be used.

Examples of the SPB-containing BR include those in which 1,2-syndiotactic polybutadiene crystal is chemically bonded with BR and dispersed, but not those in which the crystal is simply dispersed in the BR. Examples of such SPB-containing BR include those manufactured by Ube Industries, Ltd., etc.

Examples of the modified BR include those obtained by adding a tin compound after polymerizing 1,3-butadiene by a lithium initiator the end of which is bonded by tin-carbon bond (a tin-modified BR), a butadiene rubber having a condensed alkoxysilane compound at its active end (a silica-modified BR), and the like. Examples of such modified BR include, for example, those manufactured by ZS Elastomers Co., Ltd., etc.

The content of BR in 100% by mass of rubber component is preferably 40% by mass or less, more preferably 35% by mass or less, and further preferably 30% by mass or less. The lower limit of the content of BR is not particularly limited, and may be 0% by mass, for example, 5% by mass or more, 10% by mass or more, or 20% by mass or more.

(Other Rubber Components)

The rubber component may contain rubber other components other than the above-described SBRs and BRs. As other rubber components, crosslinkable rubber components commonly used in the rubber industry can be used, such as, for example, a natural rubber (NR), an isoprene rubber (IR), a styrene-isoprene-butadiene copolymer rubber (SIBR), a styrene-isobutylene-styrene block copolymer (SIBS), a chloroprene rubber (CR), an acrylonitrile-butadiene rubber (NBR), a hydrogenated nitrile rubber (HNBR), a butyl rubber (IIR), an ethylene propylene rubber, a polynorbornene rubber, a silicone rubber, a polyethylene chloride rubber, a fluororubber (FKM), an acrylic rubber (ACM), and a hydrin rubber. These other rubber components may be used alone, or two or more thereof may be used in combination.

<<Filler>>

As a filler, any fillers commonly used in the rubber industry can be used. Examples of such filler can include carbon black or silica, as well as aluminium hydroxide, alumina (aluminum oxide), clay, calcium carbonate, mica, and the like. The filler can be used alone, or two or more thereof can be used in combination. As a filler, those comprising carbon black, consisting of only carbon black, comprising silica, consisting of only silica, comprising silica and carbon black, or consisting of only silica and carbon black can be appropriately used. Among them, those consisting of only carbon black or consisting of only silica and carbon black are preferable from the reason that the effects of the present disclosure can be obtained.

(Carbon Black)

As carbon black, those commonly used in the rubber industry can be appropriately utilized. Examples of carbon black include, for example, GPF, FEF, HAF, ISAF, SAF, and the like, or N110, N115, N120, N125, N134, N135, N219, N220, N231, N234, N293, N299, N326, N330, N339, N343, N347, N351, N356, N358, N375, N539, N550, N582, N630, N642, N650, N660, N683, N754, N762, N765, N772, N774, N787, N907, N908, N990, N991, and the like. As a commercially available product, products manufactured by Asahi Carbon Co., Ltd., Cabot Japan K.K., Tokai Carbon Co., Ltd., Mitsubishi Chemical Corporation, Lion Corporation, NSCC Carbon Co., Ltd., and Columbia Carbon can be used. They may be used alone, or two or more thereof may be used in combination.

The nitrogen adsorption specific surface area ($N_2SA$) of carbon black is preferably 50 $m^2/g$ or more, more preferably 80 $m^2/g$ or more, further preferably 100 $m^2/g$ or more, even further preferably 150 $m^2/g$ or more, and still further preferably 175 $m^2/g$ or more. When it is a lower limit or more, a good abrasion resistance and grip performance tend to be obtained. Furthermore, the $N_2SA$ is preferably 300 $m^2/g$ or less, more preferably 250 $m^2/g$ or less, further preferably 200 $m^2/g$ or less, even further preferably 160 $m^2/g$ or less, and still further preferably 150 $m^2/g$ or less. When it is an upper limit or less, a good dispersion in carbon black tends to be obtained. In addition, the $N_2SA$ of carbon black is calculated by JIS K 6217-2: 2001.

The dibutyl phthalate (DBP) oil absorption amount of carbon black is preferably 50 ml/100 g or more, and more preferably 100 ml/100 g or more, from the viewpoint of sufficient reinforcing property. Furthermore, the DBP oil absorption amount of carbon black is preferably 200 ml/100 g or less, and more preferably 150 ml/100 g or less, from the viewpoint of wet grip performance. In addition, the DBP oil absorption amount of carbon black is measured conforming to JIS K 6217-4: 2001.

The content of carbon black is preferably 1 part by mass or more, more preferably 5 parts by mass or more, further preferably 10 parts by mass or more, even further preferably 20 parts by mass or more, and still further preferably 30 parts by mass or more based on 100 parts by mass of rubber component, from the viewpoints of a good ultraviolet crack performance and a good abrasion resistance. Furthermore, the content is preferably 200 parts by mass or less, more preferably 150 parts by mass or less, further preferably 120 parts by mass or less, even further preferably 110 parts by mass or less, and still further preferably 100 parts by mass or less, from the viewpoints of processability and heat generation performance.

(Silica)

Silica is not particularly limited, and those which are common in the tire industry can be used, such as, for example, silica prepared by a dry process (anhydrous silica) and silica prepared by a wet process (hydrous silica). Among them, hydrous silica prepared by a wet process is preferable from the reason that it has many silanol groups. Silica may be used alone, or two or more thereof may be used in combination.

The nitrogen adsorption specific surface area ($N_2SA$) of silica is preferably 140 $m^2/g$ or more, more preferably 160 $m^2/g$ or more, and further preferably 170 $m^2/g$ or more, from the viewpoints of fuel efficiency and abrasion resistance. Furthermore, it is preferably 350 $m^2/g$ or less, more preferably 300 $m^2/g$ or less, and further preferably 250 $m^2/g$ or less, from the viewpoints of fuel efficiency and processability. In addition, the $N_2SA$ of silica in the present specification is a value measured by a BET method according to ASTM D3037-93.

The content of silica based on 100 parts by mass of rubber component is preferably 5 parts by mass or more, more preferably 10 parts by mass or more, further preferably 20 parts by mass or more, even further preferably 30 parts by mass or more, and still further preferably 40 parts by mass or more, from the viewpoint of wet grip performance. Furthermore, it is preferably 150 parts by mass or less, more preferably 130 parts by mass or less, further preferably 110 parts by mass or less, and even further preferably 90 parts by mass or less, from the viewpoint of abrasion resistance.

The total content of filler is preferably 50 parts by mass or more, and more preferably 70 parts by mass or more based on 100 parts by mass of rubber component, from the viewpoint of sufficient reinforcing property. On the other hand, the content is preferably 250 parts by mass or less, more preferably 180 parts by mass or less, and further preferably 150 parts by mass or less, from the viewpoint of wet grip performance.

(Silane Coupling Agent)

A silane coupling agent is preferably used for the rubber component. The silane coupling agent is not particularly limited, and any silane coupling agents conventionally used in the rubber industry can be used. Specific examples of the silane coupling agent include, for example, silane coupling agents having a sulfide group such as bis(3-triethoxysilylpropyl) disulfide and bis(3-triethoxysilylpropyl)tetrasulfide; silane coupling agents having a mercapto group such as 3-mercaptopropyl trimethoxy silane, 3-mercaptopropyl triethoxy silane, 2-mercaptoethyl trimethoxy silane, 2-mercaptoethyl triethoxy silane, and NXT-Z30, NXT-Z45, NXT-Z60, and NXT-Z100 manufactured by Momentive Performance Materials, and Si363 by Evonik Degussa GmbH; silane coupling agents having a thioester group such as 3-octanoylthio-1-propyltriethoxysilane, 3-hexanoylthio-1-propyltriethoxysilane, and 3-octanoylthio-1-propyltrimethoxysilane; silane coupling agents having a vinyl group such as vinyltriethoxysilane and vinyltrimethoxysilane; silane coupling agents having an amino group such as 3-aminopropyltriethoxysilane, 3-aminopropyltrimethoxysilane, and 3-(2-aminoethyl)aminopropyltriethoxysilane; glycidoxy-based silane coupling agents such as γ-glycidoxypropyltriethoxysilane and γ-glycidoxypropyltrimethoxysilane; nitro-based silane coupling agents such as 3-nitropropyltrimethoxysilane and 3-nitropropyltriethoxysilane; chloro-based silane coupling agents such as 3-chloropropyltrimethoxysilane and 3-chloropropyltriethoxysilane, and the like. Among them, silane coupling agents having a sulfide group, silane coupling agents having a mercapto group, and silane coupling agents having a thioester group are preferable, and silane coupling agents having a sulfide group are more preferable. These silane coupling agents may be used alone, or two or more thereof may be used in combination.

The content of silane coupling agent is preferably 1 part by mass or more, more preferably 2 parts by mass or more, and further preferably 5 parts by mass or more based on 100 parts by mass of silica, from the viewpoint of sufficient chipping resistance. Furthermore, the content of silane coupling agent is preferably 20 parts by mass or less, more preferably 15 parts by mass or less, and further preferably 12 parts by mass or less based on 100 parts by mass of silica, from the viewpoint of compounding effect suitable for the content.

<<Resin Component>>

The rubber composition may contain resin components commonly used in the tire industry. Examples of such resin components include, for example, a petroleum resin, a terpene-based resin, a rosin-based resin, a phenol-based resin, a coumarone-based resin, and the like, each of which may be used alone, or two or more thereof may be used in combination. Among them, the rosin-based resin is preferable from the viewpoint of the effects of the present disclosure.

(Petroleum Resin)

Examples of the petroleum resin include, but not particularly limited to, an aliphatic-based petroleum resin, an aromatic-based petroleum resin, and an aliphatic/aromatic copolymer-based petroleum resin. They may be used alone, or two or more thereof may be used in combination. As the aliphatic-based petroleum resin, a resin obtained by cationically polymerizing an unsaturated monomer such as isoprene or cyclopentadiene, which is a petroleum fraction corresponding to C4-C5 (C5 fraction) (also referred to as a C5-based petroleum resin) can be used. As the aromatic-based petroleum resin, a resin obtained by cationically polymerizing a monomer such as vinyltoluene, alkylstyrene, and indene, which is a petroleum fraction corresponding to C8-C10 (C9 fraction) (also referred to as a C9-based petroleum resin) can be used. As the aliphatic/aromatic copolymer-based petroleum resin, a resin obtained by copolymerizing the above-described C5 fraction and C9 fraction (also referred to as a C5-C9-based petroleum resin) is used. Moreover, those obtained by being hydrogenated with the above-described petroleum resin may be used. Among them, the C5-C9-based petroleum resin is appropriately used.

As the C5-C9-based petroleum resin, for example, commercially available products are appropriately used, such as those manufactured by Zibo Luhua Hongjin New Material Co., Ltd., those manufactured by Shandong Qilong Chemical Co., Ltd., and those manufactured by Tosoh Corporation.

(Terpene-Based Resin)

Examples of the terpene-based resin include a polyterpene resin, a terpene phenol resin, a terpene styrene resin, and the like. Among them, the terpene styrene resin is appropriately used since it is particularly compatible with both the SBR and the BR and sulfur is easily dispersed in the rubber component.

The polyterpene resin is a resin having at least one selected from terpene compounds such as α-pinene, β-pinene, limonene, and dipentene as a raw material. The terpene phenol resin is a resin having the above-described terpene compound and a phenol-based compound as raw materials. The terpene styrene resin is a resin having the above-described terpene compound and styrene as raw materials. The polyterpene resin and the terpene styrene resin may be hydrogenated resins (a hydrogenated polyterpene resin, a hydrogenated terpene styrene resin). Hydrogenation to the terpene-based resin can be performed by a known method, and a commercially available hydrogenated resin can be also used.

Any one of the above-listed terpene-based resins may be used alone, or two or more thereof may be used in combination. In the present disclosure, a commercially available product may be used as the terpene-based resin. Examples of such commercially available products include those manufactured and sold by Yasuhara Chemical Co., Ltd. and the like.

(Rosin-Based Resin)

Example of the rosin-based resin include, but not particularly limited to, for example, a natural resin rosin and a rosin-modified resin obtained by modifying it by hydrogenation, disproportionation, dimerization, esterification, or the like.

(Phenol-Based Resin)

Examples of the phenol-based resin include, but not particularly limited to, a phenol formaldehyde resin, an alkylphenol formaldehyde resin, an alkylphenol acetylene resin, an oil-modified phenol formaldehyde resin, and the like.

(Coumarone-Based Resin)

The coumarone-based resin is a resin containing coumarone as a main component, for example, a coumarone resin, a coumarone indene resin, a copolymer resin containing coumarone, indene, and styrene as main components, and the like. Among them, the copolymer resin containing coumarone, indene, and styrene as main components is preferable from the viewpoint of the effects of the present disclosure.

(Content of Resin Component)

The content of the resin component based on 100 parts by mass of rubber component is preferably 1 part by mass or more, more preferably 2 parts by mass or more, further preferably 3 parts by mass or more, and particularly preferably 5 parts by mass or more, from the viewpoints of adhesion performance and grip performance. Furthermore, it is preferably 50 parts by mass or less, more preferably 40 parts by mass or less, further preferably 30 parts by mass or less, and particularly preferably 25 parts by mass or less, from the viewpoints of abrasion resistance and grip performance.

(Softening Point of Resin Component)

The softening point of the resin component is preferably 160° C. or lower, more preferably 145° C. or lower, and further preferably 130° C. or lower, from the viewpoint of grip performance. Furthermore, the softening point is preferably 20° C. or higher, more preferably 35° C. or higher, further preferably 50° C. or higher, even further preferably 80° C. or higher, and still further preferably 100° C. or higher, from the viewpoint of grip performance. In addition, in the present disclosure, the softening point is a temperature at which a sphere drops when the softening point specified in JIS K 6220-1: 2001 is measured with a ring and ball softening point measuring device.

(Weight-Average Molecular Weight of Resin Component)

The weight-average molecular weight (Mw) of the resin component is preferably 300 or more, more preferably 400 or more, and further preferably 500 or more, from the viewpoints of less tendency to volatilization and a good grip performance. Furthermore, the Mw is preferably 15,000 or less, more preferably 10,000 or less, and further preferably 8,000 or less.

(SP Value of Resin Component)

The SP value of the resin component is preferably in the range of 8 to 11, more preferably in the range of 8 to 10, and further preferably in the range of 8.3 to 9.5, from the viewpoint of an excellent compatibility with the rubber component (particularly the SBR). When a resin having a SP value within the above-described ranges is used, its compatibility with the SBR and BR improves, and the abrasion resistance and breaking elongation can be improved.

<<Other Compounding Agents>>

The rubber composition according to the present disclosure can appropriately comprise compounding agents conventionally and generally used in the tire industry, for example, an oil, a liquid polymer, a wax, a processing aid, an antioxidant, stearic acid, zinc oxide, a vulcanizing agent such as sulfur, a vulcanization accelerator, and the like, in addition to the above-described components.

(Oil)

As oil, for example, process oil, vegetable fats and oils, or a mixture thereof can be used. As process oil, for example, a paraffin-based process oil, an aroma-based process oil, a naphthene-based process oil, or the like can be used. Among them, the paraffin-based process oil and the aroma-based process oil are preferable from the viewpoint of the effects of the present disclosure.

The content of oil is preferably 10 parts by mass or more, more preferably 15 parts by mass or more, and further preferably 20 parts by mass or more based on 100 parts by mass of rubber component, from the viewpoint of on-ice performance. Furthermore, it is preferably 80 parts by mass or less, more preferably 60 parts by mass or less, and further preferably 50 parts by mass or less, from the viewpoint of steering stability. In addition, in the present specification, the content of oil also includes an amount of oil contained in an oil-extended rubber.

(Liquid Polymer)

The liquid polymer is not particularly limited as long as it is in a liquid state at room temperature (25° C.), and examples of the liquid polymer include, for example, liquid diene-based polymers such as a liquid styrene-butadiene copolymer (a liquid SBR), a liquid butadiene polymer (a liquid BR), a liquid isoprene polymer (a liquid IR), and a liquid styrene isoprene copolymer (a liquid SIR). Among them, the liquid SBR is preferable from the viewpoint of grip performance. The molecular weight of the liquid polymer preferably has a weight-average molecular weight of $1.0 \times 10^3 \sim 2.0 \times 10^5$ in terms of polystyrene measured by gel permeation chromatography (GPC).

The content of liquid polymer when contained based on 100 parts by mass of rubber component is preferably 1 part by mass or more, and more preferably 5 parts by mass or more, from the viewpoint of grip performance. Furthermore, it is preferably 40 parts by mass or less, more preferably 30 parts by mass or less, further preferably 20 parts by mass or less, and particularly preferably 10 parts by mass or less, from the viewpoint of abrasion resistant.

(Wax)

The content of wax when contained based on 100 parts by mass of rubber component is preferably 0.5 parts by mass or more, and more preferably 1 part by mass or more, from the viewpoint of weather resistance of the rubber. Furthermore, it is preferably 10 parts by mass or less, and more preferably 5 parts by mass or less, from the viewpoint of suppressing whitening of the tire by bloom.

(Processing Aid)

Examples of processing aid include, for example, a fatty acid metal salt, a fatty acid amide, an amide ester, a silica surface active agent, a fatty acid ester, a mixture of a fatty acid metal salt and an amide ester, a mixture of a fatty acid metal salt and a fatty acid amide, and the like. They may be used alone, or two or more thereof may be used in combination. Among them, the fatty acid metal salt, the amide ester, the mixture of the fatty acid metal salt and the amide ester, and the mixture of the fatty acid metal salt and the fatty acid amide are preferable, and the mixture of the fatty acid metal salt and the fatty acid amide is particularly preferable. As processing aid, for example, a fatty acid soap-based processing aid manufactured by Schill+Seilacher GmbH, and the like can be used.

The content of processing aid when contained based on 100 parts by mass of rubber component is preferably 0.5 parts by mass or more, and more preferably 1 part by mass or more, from the viewpoint of demonstrating an effect of improvement in the processability. Furthermore, it is preferably 10 parts by mass or less, and more preferably 8 parts by mass or less, from the viewpoints of abrasion resistance and breaking strength.

(Antioxidant)

Examples of antioxidant include, but not particularly limited to, for example, each amine-based, quinoline-based, quinone-based, phenol-based, and imidazole-based compound, and antioxidants such as a carbamic acid metal salt, preferably, phenylenediamine-based antioxidants such as
N-(1,3-dimethylbutyl)-N'-phenyl-p-phenylenediamine,
N-isopropyl-N'-phenyl-p-phenylenediamine,
N,N'-diphenyl-p-phenylenediamine,
N,N'-di-2-naphthyl-p-phenylenediamine,
N-cyclohexyl-N'-phenyl-p-phenylenediamine,
N,N'-bis(1-methylheptyl)-p-phenylenediamine,
N,N'-bis(1,4-dimethylpentyl)-p-phenylenediamine,
N,N'-bis(1-ethyl-3-methylpentyl)-p-phenylenediamine,
N-4-methyl-2-pentyl-N'-phenyl-p-phenylenediamine,
N,N'-diaryl-p-phenylenediamine, hindered diaryl-p-phenylenediamine,
phenylhexyl-p-phenylenediamine, and phenyloctyl-p-phenylenediamine, and quinoline-based antioxidants such as 2,2,4-trimethyl-1,2-dihydroquinoline polymer and 6-ethoxy-2,2,4-trimethyl-1,2-dihydroquinoline. These antioxidants may be used alone, or two or more thereof may be used in combination.

The content of antioxidant when contained based on 100 parts by mass of rubber component is preferably 0.5 parts by mass or more, and more preferably 1 part by mass or more, from the viewpoint of ozone crack resistance of a rubber. Furthermore, it is preferably 10 parts by mass or less, and more preferably 5 parts by mass or less, from the viewpoints of abrasion resistance and wet grip performance.

(Stearic Acid)

The content of stearic acid when contained based on 100 parts by mass of rubber component is preferably 0.5 parts by mass or more, and more preferably 1 part by mass or more, from the viewpoint of processability. Furthermore, it is preferably 10 parts by mass or less, and more preferably 5 parts by mass or less, from the viewpoint of vulcanization rate.

(Zinc Oxide)

The content of zinc oxide when contained based on 100 parts by mass of rubber component is preferably 0.5 parts by mass or more, and more preferably 1 part by mass or more, from the viewpoint of processability. Furthermore, it is preferably 10 parts by mass or less, and more preferably 5 parts by mass or less, from the viewpoint of abrasion resistance.

(Vulcanizing Agent)

Sulfur is appropriately used as a vulcanizing agent. As sulfur, powdery sulfur, oil processing sulfur, precipitated sulfur, colloidal sulfur, insoluble sulfur, highly dispersible sulfur, and the like can be used.

The content of sulfur as a vulcanizing agent when contained based on 100 parts by mass of rubber component is preferably 0.5 parts by mass or more, and more preferably 0.7 parts by mass or more, from the viewpoints of ensuring sufficient vulcanization reaction and obtaining good grip performance and abrasion resistance. Furthermore, it is preferably 5.0 parts by mass or less, more preferably 4.0 parts by mass or less, and further preferably 3.0 parts by mass or less, from the viewpoint of suppressing deterioration.

As vulcanizing agents other than sulfur, for example, vulcanizing agents containing a sulfur atom such as those manufactured by Taoka Chemical Co., Ltd., those manufactured by Flexsys, and those manufactured by LANXESS, organic peroxides such as dicumyl peroxide, and the like can be used.

(Vulcanization Accelerator)

Examples of the vulcanization accelerator include, for example, sulfenamide-based, thiazole-based, thiuram-based, thiourea-based, guanidine-based, dithiocarbamic acid-based, aldehyde-amine-based or aldehyde-ammonia-based, imidazolin-based, and xanthate-based vulcanization accelerators, and the like. These vulcanization accelerators may be used alone, or two or more thereof may be used in combination. Among them, at least one of the sulfenamide-based, guanidine-based, and thiazole-based vulcanization accelerators is preferable, and the sulfenamide-based and thiazole-based vulcanization accelerators are preferably used in combination.

Examples of the sulfenamide-based vulcanization accelerator include, for example, N-tert-butyl-2-benzothiazylsulfenamide (TBBS), N-cyclohexyl-2-benzothiazylsulfenamide (CBS), N,N-dicyclohexyl-2-benzothiazylsulfenamide (DCBS), and the like. Among them, N-cyclohexyl-2-benzothiazylsulfenamide is preferable.

Examples of the guanidine-based vulcanization accelerator include, for example, 1,3-diphenyl guanidine, 1,3-di-o-tolylguanidine, 1-o-tolylbiguanide, di-o-tolylguanidine salt of dicatechol borate, 1,3-di-o-cumenylguanidine, 1,3-di-o-biphenylguanidine, 1,3-di-o-cumenyl-2-propionylguanidine, and the like. Among them, 1,3-diphenylguanidine is preferable.

Examples of the thiazole-based vulcanization accelerator include, for example, 2-mercaptobenzothiazole, cyclohexylamine salt of 2-mercaptobenzothiazole, di-2-benzothiazolyl disulfide, and the like. Among them, 2-mercaptobenzothiazole is preferable.

The content of the vulcanization accelerator when contained based on 100 parts by mass of rubber component is preferably 1 part by mass or more, and more preferably 2 parts by mass or more. Furthermore, it is preferably 8 parts by mass or less, more preferably 7 parts by mass or less, and further preferably 6 parts by mass or less. When the content of the vulcanization accelerator is within the above-described ranges, breaking strength and elongation tend to be secured.

<Manufacturing Rubber Composition>

The rubber composition can be manufactured by a known method, for example, by kneading each of the above-described components using a rubber kneading apparatus such as an open roll and a closed type kneader (Banbury mixer, kneader, etc.). The kneading step includes, for example, a base kneading step of kneading compounding agents and additives other than vulcanizing agents and vulcanization accelerators and a final kneading (F kneading) step of adding vulcanizing agents and vulcanization accelerators to the kneaded mixture obtained by the base kneading step and kneading it. Furthermore, the above-described base kneading step can be divided into a plurality of steps as desired. Examples of the kneading condition include, but not particularly limited to, for example, in the base kneading step, kneading for 3-10 minutes at a discharge temperature of 150-170° C., and in the final kneading step, kneading for 1-5 minutes at a discharge temperature of 50-110° C.

<Manufacturing Tread and Tire>

The rubber composition compounded with the above-described components can be extruded corresponding to the shape of the tread at the unvulcanized stage and molded on a tire molding machine with other tire members in a usual manner to produce an unvulcanized tire. This unvulcanized tire can be heated and pressurized (vulcanized) in a vulcanizer to obtain a tire. Examples of the vulcanization condition include, but not particularly limited to, for example, vulcanizing for 10-30 minutes at 150-200° C.

<Tire for Motorcycle>

The tire of the present disclosure can be appropriately used as a tire for a motorcycle.

EXAMPLE

Based on Examples, the present disclosure will be specifically described, but is not limited to these Examples.

Various chemicals used in Examples and Comparative examples will be described as follows.

SBR 1: a styrene-butadiene rubber (T4850, weight-average molecular weight (Mw): 350,000, styrene content: 40% by mass, amount of bonded vinyl: 46%, glass transition temperature (Tg): −17° C.) manufactured by Asahi Kasei Corporation SBR 2: a modified styrene-butadiene rubber synthesized by the following Manufacturing example 1 (an amino group-modified SBR, styrene content: 21% by mass, amount of bonded vinyl: 63%)

SBR 3: a modified styrene-butadiene rubber synthesized by the following Manufacturing example 2 (a silanol group-modified SBR, styrene content: 21% by mass, amount of bonded vinyl: 59.2%)

SBR 4: a modified styrene-butadiene rubber synthesized by the following Manufacturing example 3 (a terminal triethoxysilyl group-modified S-SBR, styrene content: 27% by mass, amount of bonded vinyl: 58%)

SBR 5: a styrene-butadiene rubber (T3830, S-SBR, styrene content: 33% by mass, amount of bonded vinyl: 36%, oil-extended product containing 37.5 parts by mass of oil content based on 100 parts by mass of rubber component) manufactured by Asahi Kasei Corporation SBR 6: a styrene-butadiene rubber (SBR1502, E-SBR, styrene content: 23.5% by mass) manufactured by JSR Corporation SBR 7: a modified hydrogenated styrene-butadiene rubber synthesized by the following Manufacturing example 4 (a modified hydrogenated SBR, hydrogenation ratio: 96 mol %, styrene content: 30% by mass, Mw: 510,000, Tg: −31° C.)

BR: a butadiene rubber (BR150, cis content: 98%) manufactured by Ube Industries, Ltd.

Carbon black 1 (CB1): a trial product (nitrogen adsorption specific surface area ($N_2SA$): 181 $m^2/g$, DBP oil absorption amount: 117-129 ml/100 g)
Carbon black 2 (CB2): Show Black N220 ($N_2SA$: 114 $m^2/g$, DBP oil absorption amount: 114 ml/100 g) manufactured by Cabot Japan K.K.
Silica: ULTRASIL VN3 (a granule silica, $N_2SA$: 175 $m^2/g$) manufactured by Evonik Degussa GmbH
Silane coupling agent (coupling agent): Si69 (bis(3-triethoxysilylpropyl) tetrasulfide) manufactured by Evonik Degussa GmbH
Zinc oxide: Zinc oxide, type III (average primary particle size: 1.0 μm) manufactured by HAKUSUI TECH
Stearic acid: Stearic acid "CAMELLIA" manufactured by NOF CORPORATION
Antioxidant: Antigen 6C (N-(1,3-dimethylbutyl)-N'-phenyl-p-phenylenediamine) manufactured by Sumitomo Chemical Co., Ltd.
Oil: Diana process oil X140 (an aroma-based process oil) manufactured by Japan Energy Corporation
Liquid SBR: L-SBR-841 (a liquid SBR, a random copolymer, Mn:10,000) manufactured by Kuraray Co., Ltd.
Resin: Coumarone V120 (a copolymer resin containing coumarone, indene and styrene as main components, softening point: 120° C.) manufactured by Nitto Chemical Industry Co., Ltd.
Wax: SUNNOC N manufactured by Ouchi Shinko Chemical Industrial Co., Ltd.
Sulfur: Powdered sulfur manufactured by Karuizawa Sulfur Co, Ltd.
Vulcanization accelerator 1: Nocceler CZ (N-cyclohexyl-2-benzothiazylsulfenamide) manufactured by Ouchi Shinko Chemical Industrial Co., Ltd.
Vulcanization accelerator 2: Nocceler M-P (2-mercaptobenzothiazole) manufactured by Ouchi Shinko Chemical Industrial Co., Ltd.
<Manufacturing SBR>

Manufacturing Example 1

Manufacturing SBR2 (Amino Group-Modified SBR)

After 5,670 g of cyclohexane, 170 g of styrene, 430 g of 1,3-butadiene, and 8.4 mmol of tetramethylethylenediamine being placed in an autoclave equipped with a stirrer under a nitrogen atmosphere, a necessary amount of n-butyllithium for neutralizing impurities which inhibit polymerization included in cyclohexane, styrene, and 1,3-butadiene was added. Then, 6.0 mmol of n-butyllithium was added as an amount used for polymerization reaction to initiate polymerization at 40° C. Next, after 10 minutes from the initiation of polymerization, 40 g of styrene and 360 g of 1,3-butadiene were continuously added over 60 minutes. Besides, the maximum temperature during the polymerization reaction was 70° C. And, after completion of continuous addition, the polymerization reaction was further continued for 10 minutes, and upon confirmation of polymerization conversion ratio in the range of 95% to 100%, 0.6 mmol of tin tetrachloride as a coupling agent in 20% by mass of cyclohexane solution was added, and the mixture was reacted at 65° C. for 10 minutes. Next, 5.4 mmol of N-phenyl-2-pyrrolidone as a modifying agent in 40% by mass of xylene solution was added, and the mixture was reacted at 65° C. for 20 minutes. Then, an amount of methanol corresponding to a mol amount twice the amount of n-butyllithium used in the polymerization reaction was added as a polymerization terminator to obtain a solution containing an amino group-modified styrene-butadiene rubber. And the solvent was removed by steam stripping, and a solid rubber was recovered, dehydrated on a roll, and further dried by a hot air dryer to obtain an amino group-modified styrene-butadiene rubber. The obtained amino group-modified styrene-butadiene rubber had a styrene content of 21% by mass and an amount of bonded vinyl of 63%.

Manufacturing Example 2

Manufacturing SBR3 (Silanol Group-Modified SBR)
(1) Manufacturing Polymerization Initiator (Lithiation of m-xylene)

20 parts of cyclohexane, 0.531 parts of m-xylene, and 0.581 parts of tetramethylethylenediamine were added in a glass reaction container under a nitrogen atmosphere. Then, with stirring, 0.641 parts of n-butyllithium (0.5 mol of tetramethylethylenediamine per 1 mol of n-butyllithium) was added, and the mixture was stirred at a reaction temperature of 60° C. for 1 day for reaction to obtain a polymerization initiator.
(2) Manufacturing Silanol Group-Modified SBR After 800 parts of cyclohexane, 94.8 parts of 1,3-butadiene, 25.2 parts of styrene, and 0.075 parts of tetramethylethylenediamine being placed in an autoclave under a nitrogen atmosphere, 0.950 parts of polymerization initiator in solution obtained above was added, and polymerization was initiated at 60° C. The polymerization reaction was continued for 60 minutes, and upon confirmation of polymerization conversion ratio in the range of 95% to 100%, 0.013 parts of dimethylamino(methyl)dichlorosilane was added, and the mixture was reacted for 15 minutes. Further, 0.059 part of dimethyl(dimethylamino)chlorosilane was added, and the mixture was reacted for 30 minutes, and then 0.064 parts of methanol was added as a polymerization terminator to obtain a solution containing a polymer. And the solvent was removed by steam tripping and dried in vacuum at 60° C. for 24 hours to obtain a solid modified SBR3. By conducing $^1$H-NMR measurement for this modified SBR3, it was confirmed that a silanol group was introduced.

Manufacturing Example 3

Manufacturing SBR4 (Triethoxysilyl Group-Modified SBR)
(1) Manufacturing Polymerization Initiator (Lithiation of 1,3,5-trimethylbenzene)

16 parts of cyclohexane, 0.841 parts of 1,3,5-trimethylbenzene, and 0.813 parts of tetramethylethylenediamine were added in a glass reaction container under a nitrogen atmosphere. Then, with stirring, 1.345 parts of n-butyllithium (0.3 mol tetramethylethylenediamine per 1 mol of n-butyllithium) was added, and the mixture was reacted with stirring at a reaction temperature of 60° C. for 2 days to obtain 18.999 parts of polymerization initiator in solution (a lithiated 1,3,5-trimethylbenzene).
(2) Manufacturing Triethoxysilyl Group-Modified SBR After 800 parts of cyclohexane, 94.8 parts of 1,3-butadiene, 25.2 parts of styrene, and 0.185 parts of tetramethylethylenediamine being placed in an autoclave under a nitrogen atmosphere, 0.812 parts of polymerization initiator obtained above in solution (a lithiated 1,3,5-trimethylbenzene) was added (an amount of tetramethylethylenediamine present in a reaction system is 2.0 mol per 1 mol of n-butyllithium used in lithiation of 1,3,5-trimethylbenzene), and polymerization was initiated at 60° C. The polymerization reaction was continued for 60 minutes, and upon confirmation of polymerization conversion ratio in the range of 95% to 100%, 1,4-bis(triethoxysilyl)-2-butene as a modifying agent was added, and the mixture was reacted for 30 minutes, and then 0.064 parts of methanol was added as a polymerization terminator to obtain a solution containing a polymer. And the solvent was removed by steam stripping and dried in vacuum at 60° C. for 24 hours to obtain a solid modified SBR4. By conducing $^1$H-NMR measurement for this modified SBR4, it was confirmed that a triethoxysilyl group was introduced.

Manufacturing Example 4

Manufacturing SBR7 (Modified Hydrogenated SBR)

To a sufficiently nitrogen-substituted heat-resistant reaction container, 2,000 ml of n-hexane, 60 g of styrene, 140 g of 1,3-butadiene, 2.5 g of THF, and 0.45 mmol of n-butyllithium were added and stirred at 50° C. for 5 hours, and polymerization reaction was performed. Then, 0.15 mol of amine-based modifying agent was added, and the mixture was stirred at 0° C. for 1 hour. Next, the mixture was stirred while supplying a hydrogen gas at a pressure of 0.4 MPa-Gauge for 20 minutes and reacted with an unreacted polymer terminal lithium to produce a lithium hydride. Hydrogenation was conducted using a catalyst containing titanocenedichloride as a main component under conditions of 0.7 MPa-Gauge of hydrogen gas supply pressure and a reaction temperature of 90° C. Upon reaching the targeted accumulation amount of hydrogenation rate for absorption of hydrogen, the reaction temperature was reduced to a normal temperature, and the hydrogen pressure was returned to the normal pressure to pull out a reaction solution from the reaction container, and the reaction solution was put in water and stirred to remove the solvent by steam stripping to obtain a hydrogenated SBR of interest.

<Manufacturing Rubber Composition and Tire>

In accordance with compounding contents shown in Table 1, using a 1.7 L Banbury mixer manufactured by Kobe Steel, Ltd., materials other than sulfur and vulcanization accelerators were kneaded under a condition of 80 to 180° C. for 5 minutes to obtain a kneaded product. Next, to the obtained kneaded product, sulfur and vulcanization accelerators were added, and the mixture was kneaded under a condition of 50° C. for 5 minutes using an open roll to obtain an unvulcanized rubber composition.

The obtained unvulcanized rubber composition was molded into a sheet-like shape and press-vulcanized under a condition of 150° C. for 30 minutes to obtain a vulcanized rubber sheet for testing.

The obtained unvulcanized rubber composition was molded into a tread shape, attached together with other tire members on a tire molding machine, and press-vulcanized under a condition of 150° C. for 30 minutes to obtain a tire for testing (tire size: 200/50R18). The obtained tire for testing was evaluated for its performance by a test method shown below.

<Rubber Hardness (Hs)>

For each vulcanized rubber sheet for testing, a rubber hardness Hs at 23° C. was measured using a durometer type A according to JIS K 6253.

<300% Modulus (M300)>

A tensile test was performed using a Table-Top Type Precision Universal Tester (AGS-X) manufactured by Shimadzu Corporation, under an atmosphere of 23° C., for No. 3 dumbbell type specimens, according to JIS K 6251 to measure a tensile stress (MPa) at 300% elongation (M300).

<Straight Running Stability>

The tires for testing described above were mounted to the rear wheels of the large motorcycle with 1,300 cc displacement (air pressure of the rear wheels: 290 kPa), and sensory evaluation was performed by a driver for a straight running stability during running around a circuit course. The straight running stability was comprehensively evaluated as a stability for a test vehicle during running a straight course at low and high speed. The results were shown by an index with Comparative example 1 being 100. The larger the numeral value is, the better the result is.

<Turning Stability on Wet Road Surface>

The tires for testing described above were mounted to the rear wheels of the large motorcycle with 1,300 cc displacement (air pressure of the rear wheels: 290 kPa), and the motorcycle was made to run on a wet road surface on which a water film is formed. And, based on sensory evaluation by a driver, turning performance during running was evaluated by an index with Comparative example 1 being 100. The larger the numeral value is, the more excellent the turning performance on the wet road surface is.

<Results>

TABLE 1

| | Comparative example | | | | Example | | | | | | | | | | | | | |
|---|---|---|---|---|---|---|---|---|---|---|---|---|---|---|---|---|---|---|
| | 1 | 2 | 3 | 4 | 1 | 2 | 3 | 4 | 5 | 6 | 7 | 8 | 9 | 10 | 11 | 12 | 13 | 14 |
| Compounding (part by mass) | | | | | | | | | | | | | | | | | | |
| SBR1 | 35 | — | — | — | — | — | — | — | — | — | — | — | — | — | — | — | — | — |
| SBR2 | 35 | — | — | — | — | 35 | — | — | — | — | — | — | — | — | — | — | — | — |
| SBR3 | 70 | — | — | — | — | 35 | — | — | — | 45 | — | — | — | — | — | — | 45 | 45 |
| SBR4 | — | 55 | 55 | — | — | — | — | 30 | — | — | — | — | — | — | — | — | — | — |
| SBR5 | — | 60 | 60 | 55 | — | — | — | — | — | — | — | 55 | — | — | — | — | — | — |
| SBR6 | — | — | — | 60 | — | — | — | — | — | — | — | 60 | — | — | — | — | — | — |
| SBR7 | — | — | — | — | 100 | — | 70 | 40 | 100 | 70 | 100 | — | 100 | 70 | 70 | 100 | 70 | 70 |
| BR | — | — | — | — | — | 50 | 30 | 30 | — | — | — | — | — | 30 | 30 | — | — | — |
| CB1 | 45 | — | — | — | 45 | 45 | 70 | 70 | 35 | 35 | — | — | 65 | 85 | 85 | 45 | 35 | 35 |
| CB2 | — | 100 | 100 | 105 | — | — | — | — | — | — | 100 | 100 | — | — | — | — | — | — |
| Silica | 50 | — | — | — | 50 | 50 | — | — | 60 | 60 | — | — | 50 | — | — | 50 | 60 | 60 |
| Coupling agent | 4 | — | — | — | 4 | 4 | — | — | 5 | 5 | — | — | 4 | — | — | 4 | 5 | 5 |
| Zinc oxide | 2 | 2.5 | 2 | 2.5 | 2 | 2 | 2.5 | 2.5 | 2 | 2 | 2.5 | 2 | 2 | 2.5 | 2.5 | 2.5 | 2 | 2 |
| Stearic acid | 2.5 | 2 | 2 | 2 | 2.5 | 2.5 | 2.5 | 2.5 | 2 | 2 | 2.5 | 2.5 | 2.5 | 2.5 | 2.5 | 2.5 | 2 | 2 |
| Antioxidant | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| Oil | 5 | 5 | — | — | 5 | 25 | 25 | 5 | 45 | 30 | 5 | 5 | 20 | 35 | 33 | 7 | 36 | 40 |
| Liquid SBR | 5 | — | — | — | 5 | 5 | 5 | 5 | 5 | 5 | 5 | 5 | 5 | 5 | 5 | 5 | 5 | 5 |
| Resin | 10 | — | — | — | 10 | 10 | 25 | 25 | 5 | 5 | — | — | 10 | 25 | 25 | 10 | 5 | 5 |
| Wax | 3 | 2.5 | 2.5 | 2.5 | 3 | 3 | 3 | 3 | 3 | 3 | 2.5 | 2.5 | 3 | 3 | 3 | 3 | 3 | 3 |
| Sulfur | 0.85 | 1.5 | 1.0 | 1.3 | 0.85 | 0.85 | 1.5 | 1.5 | 1.5 | 1.5 | 1.5 | 1.5 | 0.85 | 1.5 | 2 | 1.5 | 0.9 | 1.5 |
| Vulcanization accelerator 1 | 2 | 2.2 | 2.0 | 2.2 | 2 | 2 | 2.2 | 2.2 | 2 | 2 | 2.2 | 2.2 | 2 | 2.2 | 2.2 | 2 | 1.8 | 2 |
| Vulcanization accelerator 2 | 1.6 | 0.1 | 0.1 | 0.1 | 1.6 | 1.6 | — | — | 1.5 | 1.5 | 0.1 | 0.1 | 1.6 | — | — | 1.6 | 1.5 | 1.5 |
| Physical property | | | | | | | | | | | | | | | | | | |
| Hs | 66 | 67 | 67 | 72 | 74 | 72 | 76 | 73 | 70 | 69 | 71 | 72 | 77 | 78 | 79 | 74 | 69 | 66 |
| M300 (MPa) | 10.5 | 12.5 | 7.7 | 11.5 | 7.2 | 7.5 | 4.8 | 5.4 | 6.8 | 6.8 | 9.7 | 8.5 | 7.5 | 4.9 | 8.5 | 8.4 | 4.8 | 4.7 |
| (M300-2)/(Hs-60) | 1.42 | 1.50 | 0.81 | 0.79 | 0.37 | 0.46 | 0.18 | 0.26 | 0.48 | 0.53 | 0.70 | 0.54 | 0.32 | 0.16 | 0.34 | 0.46 | 0.31 | 0.45 |
| Evaluation | | | | | | | | | | | | | | | | | | |
| Straight running stability | 100 | 104 | 101 | 110 | 110 | 108 | 112 | 111 | 108 | 108 | 109 | 109 | 110 | 110 | 109 | 110 | 106 | 100 |
| Turning stability on wet road surface | 100 | 94 | 99 | 97 | 106 | 106 | 110 | 109 | 106 | 106 | 101 | 103 | 106 | 110 | 103 | 104 | 110 | 110 |
| Overall performance | 200 | 198 | 200 | 207 | 216 | 214 | 222 | 220 | 214 | 214 | 210 | 212 | 216 | 220 | 212 | 214 | 216 | 210 |

As shown in Table 1, the tires of Examples exhibit an excellent turning stability performance on wet road surface compared with the tires of Comparative examples. Furthermore, the tires of the present disclosure are also excellent in straight running stability. In addition, in Table 1, overall performance is obtained by summing indexes for straight running stability and turning stability on wet road surface.

The invention claimed is:

1. A tire for a motorcycle comprising:

a tread composed of a rubber composition, which comes into contact with a road surface, the rubber composition including:

a rubber component;

a resin selected from the group consisting of a petroleum resin, a rosin-based resin, a phenol-based resin, and a coumarone-based resin; and carbon black in an amount of 20 to 200 parts by mass based on 100 parts by mass of the rubber component, wherein the resin has a weight-average molecular weight of from 300 to 15,000, Hs being a rubber hardness and M300 being a tensile stress (MPa) at 300% elongation of the rubber composition of the tread satisfy Equations 1, 2, and 3:

$$60 \leq Hs \leq 80, \quad \text{Equation 1:}$$

$$2 \leq M300 \leq 12, \text{ and} \quad \text{Equation 2:}$$

$$(M300-2)/(Hs-60) \leq 0.75, \text{ and} \quad \text{Equation 3:}$$

the tire is configured as a motorcycle tire.

2. The tire for a motorcycle of claim 1, wherein Equation 3 is:

$$(M300-2)/(Hs-60) \leq 0.69.$$

3. The tire for a motorcycle of claim 1, wherein Equation 3 is:

$$(M300-2)/(Hs-60) \leq 0.53.$$

4. The tire for a motorcycle of claim 1, wherein Equation 1 is:

$$68 \leq Hs \leq 78.$$

5. The tire for a motorcycle of claim 1, wherein Equation 2 is:

$$4 \leq M300 \leq 11.$$

6. The tire for a motorcycle of claim 1, wherein the rubber component comprises a styrene-butadiene rubber.

7. The tire for a motorcycle of claim 6, wherein the carbon black is in an amount of 30 to 200 parts by mass based on 100 parts by mass of the rubber component.

8. The tire for a motorcycle of claim 6, wherein the rubber composition further comprises silica and a silane coupling agent.

* * * * *